United States Patent
Kanerva et al.

(10) Patent No.: US 6,219,550 B1
(45) Date of Patent: Apr. 17, 2001

(54) HANDOVER IN A MOBILE COMMUNICATION SYSTEM WITH ADJUSTABLE ERROR CORRECTION

(75) Inventors: Mikko Kanerva, Helsinki; Jari Vainikka, Vantaa; Juha Räsänen, Espoo; Risto Aalto, Riihimäki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/171,418

(22) PCT Filed: Feb. 11, 1998

(86) PCT No.: PCT/FI98/00124

§ 371 Date: Mar. 5, 1999

§ 102(e) Date: Mar. 5, 1999

(87) PCT Pub. No.: WO98/37720

PCT Pub. Date: Aug. 27, 1998

(30) Foreign Application Priority Data

Feb. 18, 1997 (FI) .................................................... 970684

(51) Int. Cl.$^7$ .................................................... H04Q 7/20
(52) U.S. Cl. ........................ 455/436; 455/525; 455/226.1
(58) Field of Search .................................... 455/437, 438, 455/525, 436, 439, 443, 444, 422, 67.1, 226.1, 226.3

(56) References Cited

U.S. PATENT DOCUMENTS

| | | | |
|---|---|---|---|
| 5,239,676 | * | 8/1993 | Strawczynski et al. ............ 455/33.2 |
| 5,285,447 | * | 2/1994 | Hulsebosch ......................... 370/69.1 |
| 5,392,453 | * | 2/1995 | Gudmundson et al. ............ 455/54.2 |
| 5,483,669 | | 1/1996 | Barnett et al. . |
| 5,513,380 | * | 4/1996 | Ivanov et al. ........................ 455/56.1 |
| 5,594,949 | * | 1/1997 | Andersson et al. .................... 455/62 |
| 5,845,192 | * | 12/1998 | Saunders ............................. 455/11.1 |
| 5,907,808 | * | 5/1999 | Vaara et al. .......................... 455/441 |
| 5,913,169 | * | 6/1999 | Vaara ................................... 455/443 |
| 5,974,320 | * | 10/1999 | Ward et al. .......................... 455/437 |
| 5,991,627 | * | 11/1999 | Honkasalo et al. ................. 455/437 |
| 6,041,235 | * | 3/2000 | Aalto ................................... 455/437 |
| 6,131,030 | * | 8/1998 | Schon et al. ........................ 455/438 |

FOREIGN PATENT DOCUMENTS

| | | |
|---|---|---|
| 454 638 A1 | 10/1991 | (EP) . |
| 92/12602 | 7/1992 | (WO) . |
| 95/28808 | 10/1995 | (WO) . |
| 96/26621 | 8/1996 | (WO) . |
| 96/38997 | 12/1996 | (WO) . |

\* cited by examiner

Primary Examiner—Edward F. Urban
Assistant Examiner—Tilahun Gesesse
(74) Attorney, Agent, or Firm—Pillsbury Winthrop LLP

(57) ABSTRACT

The invention relates to a handover method in a mobile communication system in which error correction of a radio signal can be arranged with different protection levels. The method comprises measuring the signal level and/or quality of neighbouring base stations (BTS) at a receiver of a mobile station (MS), comparing the measurement results thus obtained and other variables of the connection with handover criteria, and performing a handover from the source cell to the target cell, when the pre-set handover criteria are met. The method of the invention is characterized by determining at least one error connection possible for the connection in a potential target cell for the handover, determining at least one handover criterion on the basis of the determined error correction of the potential target cell, and setting the error correction of the connection in the target cell (BTS2) as said error correction of the base station of the target cell. The invention further relates to a mobile communication system for performing handover.

5 Claims, 3 Drawing Sheets

HANDOVER IN A MOBILE COMMUNICATION SYSTEM WITH ADJUSTABLE ERROR CORRECTION

This application is the national phase of international application PCT/FI98/00124 filed Feb. 11, 1998 which designated the U.S.

FIELD OF THE INVENTION

The invention relates to a handover method in a mobile communication system in which error correction of a radio signal can be arranged with different protection levels. The method comprises measuring the signal level and/or quality of neighbouring base stations and a serving base station at a receiver of a mobile station, comparing the measurement results thus obtained and other variables of the connection with handover criteria, and performing a handover from the source cell to the target cell when the handover criteria are met.

The invention also relates to a mobile communication system for performing handover.

BACKGROUND OF THE INVENTION

In cellular mobile communication systems, a radio coverage area is implemented with a plurality of slightly overlapping radio cells. When a mobile station moves from one cell to another, handover to a new radio cell is performed on the basis of predetermined handover criteria. The aim is to perform handover in a manner that disturbs an ongoing call as little as possible. Handover is normally performed on the basis of radio path criteria, but it may also be performed for other reasons, e.g. to divide the load, or to reduce transmission powers, or when a mobile station has moved too far from the base station, in which case the propagation delay of the radio signal becomes too great.

FIG. 1 of the appended drawings shows a simplified block diagram of the pan-European GSM mobile communication system. A mobile station MS is connected over a radio path to a base transceiver station BTS, in the case of FIG. 1 to BTS1. A base station system BSS consists of a base station controller BSC and base stations BTS controlled by the BSC. A plurality of base station controllers BSC usually operate under the control of a mobile services switching centre MSC. An MSC communicates with other MSCs and, through a gateway mobile services switching centre GMSC, with a public switched telephone network. The operation of the entire system is controlled by an operation and maintenance centre OMC. The subscriber data of a mobile station MS are stored permanently in a home location register HLR of the system and temporarily in the visitor location register VLR in the area of which the MS is located at a given moment.

A mobile station MS and the serving base station BTS1 continuously measure the signal level and quality of the radio connection for example to determine the need for handover. The MS measures the signals of the serving base station BTS1 and the base stations BTS that are closest to its location area for instance to select a suitable target cell for handover. In the GSM mobile communication network, for example, an MS may simultaneously measure the signal level of both the serving base station and up to 32 other base stations. Via the serving base station BTS1, the MS is informed of the neighbouring cells it should measure. The measurement results of each cell are identified on the basis of the combination of a base station identity code BSIC and the frequency of the broadcast control channel BCCH.

The mobile station MS sends the measuring results regularly as a report message through the serving base station BTS1 to the base station controller BSC. A report message contains the measurement results of the serving base station and up to six best neighbouring base stations. Handover from a serving cell to a neighbouring cell may take place, for example, when the measurement results of the mobile station/base station indicate a low signal level and/or quality and a higher signal level is achieved in the neighbouring cell, or when a neighbouring cell allows communication at lower transmission powers. In addition, a handover to the most suitable neighbouring cell is performed when the serving base station is overloaded, or when an MS has moved too far from the serving base station BTS, or if it is necessary to change the base station for some other reason. The selection of the target cell for handover is influenced, for example, by the signal level and/or load of the target cell. In order for the stability of the mobile communication network to be ensured, the measurement results and parameters used in handover are averaged over a given period of time. The averaging process makes handover less sensitive to measurement results distorted by instantaneous interference or fading.

The base station controller BSC makes the decisions relating to handover. If the target cell is controlled by another BSC, the handover may be performed under the control of the MSC. Another possibility is that handover decisions are always made in a centralized manner in the MSC. If necessary, the BSC gives a handover command to the MS through the BTS.

In a mobile communication system implemented by code division multiple access (CDMA) technology, handover performed in the manner described above is called hard handover. In addition, CDMA systems can use so-called soft handover, in which a mobile station, during a handover, may be simultaneously connected to the network through several base stations. When one of these base stations proves to be better than the others on the basis of its signal, the connections of the mobile station with the other base stations are released, and the call is continued only through the best base station. Soft handover prevents recurring handovers between base stations when a mobile station is located on the periphery of cells.

Transmission errors which deteriorate the quality of a transmitted signal occur on the transmission path when speech or data is transmitted in a digital telecommunication system. Transmission errors occur on the transmission path when a signal is disturbed, for example, on account of multipath propagation, an interfering signal or high background noise level. Error correction of a digital signal to be transmitted, e.g. channel coding and/or retransmission, is used for improving the quality of the transmission and the tolerance of transmission errors. In channel coding, repetition is added to the original bit string of encoded speech or data by error correcting bits calculated from the original signal. In the receiver, the channel coding is decoded in a channel decoder, whereby the signal errors that have occurred during the transmission can be detected or even corrected by means of the correcting bits. Retransmission is used for correcting transmission errors either independently or, for example, in addition to channel coding: the errors in a channel coded transmission are corrected by retransmission of distorted frames. When the quality of the connection deteriorates, the number of erroneous and lost frames grows, and thus also the number of retransmissions grows.

Channel coding increases the number of bits to be transmitted. In the GSM mobile communication system, for example, error correcting bits with a transmission rate of 9.8 kbit/s are added to a full-rate 13 kbit/s speech signal, whereby the total transmission rate is 22.8 kbit/s. The level of the protection provided by channel coding is arranged according to the need. If a large number of data are to be transmitted fast, the amount of channel coding is reduced to allow more payload to be transmitted on the transmission channel. Channel coding may be arranged either to both detect errors occurred during the transmission and correct them or to merely detect them. In the GSM system, bits to be transmitted are divided according to their importance into different classes, in which channel coding is provided at a predetermined level. The different elements of the mobile communication system may limit the selection and implementation of the channel coding provided for a connection. A mobile station may, for instance, support only certain channel codings. Furthermore, the protection level of the provided channel coding depends on the capability of the base station and other network elements to employ different channel codings.

A problem with the handovers of the prior art is that the quality of the radio connection after handover is not always sufficient for a connection using weak channel coding. Another problem is that since network planning is usually intended for channels using normal channel coding, a handover is not performed to a target cell whose signal level and/or quality is too low for a connection using normal channel coding but sufficient for a connection employing more efficient channel coding.

BRIEF DESCRIPTION OF THE INVENTION

An object of the present invention is to provide an optimal way of selecting the target cell for a handover in an environment where error corrections of several different levels are used.

This new type of handover is achieved with a method of the invention, which is characterized by determining at least one error correction possible for the connection in a potential target cell for the handover, determining at least one handover criterion on the basis of the determined error correction of the potential target cell, and setting the error correction of the connection in the target cell as said error correction of the base station of the target cell.

Another object of the invention is provide a mobile communication system where error correction of a radio signal can be arranged with different protection levels, said system being arranged to measure the signal level and/or quality of neighbouring base stations and a serving base station at a receiver of a mobile station, compare the measurement results thus obtained and other variables of the connection with handover criteria, and perform a handover from the source cell to the target cell, when the pre-set handover criteria are met. According to the invention, the mobile communication system is characterized in that by being arranged to determine at least one error correction possible for the connection in a potential target cell for the handover, determine at least one handover criterion on the basis of the determined error correction of the potential target cell, and set the error correction of the connection in the target cell as said error correction of the target cell.

The invention is based on the idea that, when a target cell is selected, the effect of error correction on the signal level required on the radio connection is taken into account.

In the handover method of the invention, the selection of the target cell for a handover is affected by the protection level of the error correction, preferably channel coding, of a potential target cell; the handover criterion is determined on the basis of this level. According to a preferred embodiment of the invention, the value of the handover criterion is increased from the normal when the error correction offered by the target cell is weaker than normal, and decreased from the normal when the error correction offered by the target cell is more efficient than normal. When a handover is to be performed, for example, because of overload in the source cell, it is checked whether the handover criterion of the invention and other handover criteria optionally set by the operator are met in the potential target cell; the handover is performed to the target cell whose base station signal best meets the pre-set handover criteria. At the same time, the error correction of the connection is set to be as determined in connection with the handover procedure of the target cell.

An advantage of such a handover is that it is ensured that the quality and/or level of the signal of the target cell is sufficient even for a radio connection using weak error correction to prevent calls from being unnecessarily lost.

Another advantage of the handover of the invention is that it can be performed to a target cell of a lower level than normal on account of suitable error correction.

Yet another advantage of the handover of the invention is that a network planned for normal error correction can offer optimal handover even to mobile stations whose error correction is implemented at a protection level different from the normal.

A further advantage of the handover of the invention is that a change in the protection level of error correction during handover ensures that the quality of the radio connection to be handed over remains sufficiently good.

Still another advantage of the claimed handover is that it reduces the probability of a call being lost on a radio connection implemented with weaker error correction than normal.

BRIEF DESCRIPTION OF THE DRAWINGS

In the following, the invention will be described in greater detail with reference to the accompanying drawings, in which.

DETAILED DESCRIPTION OF THE INVENTION

Figure 1:
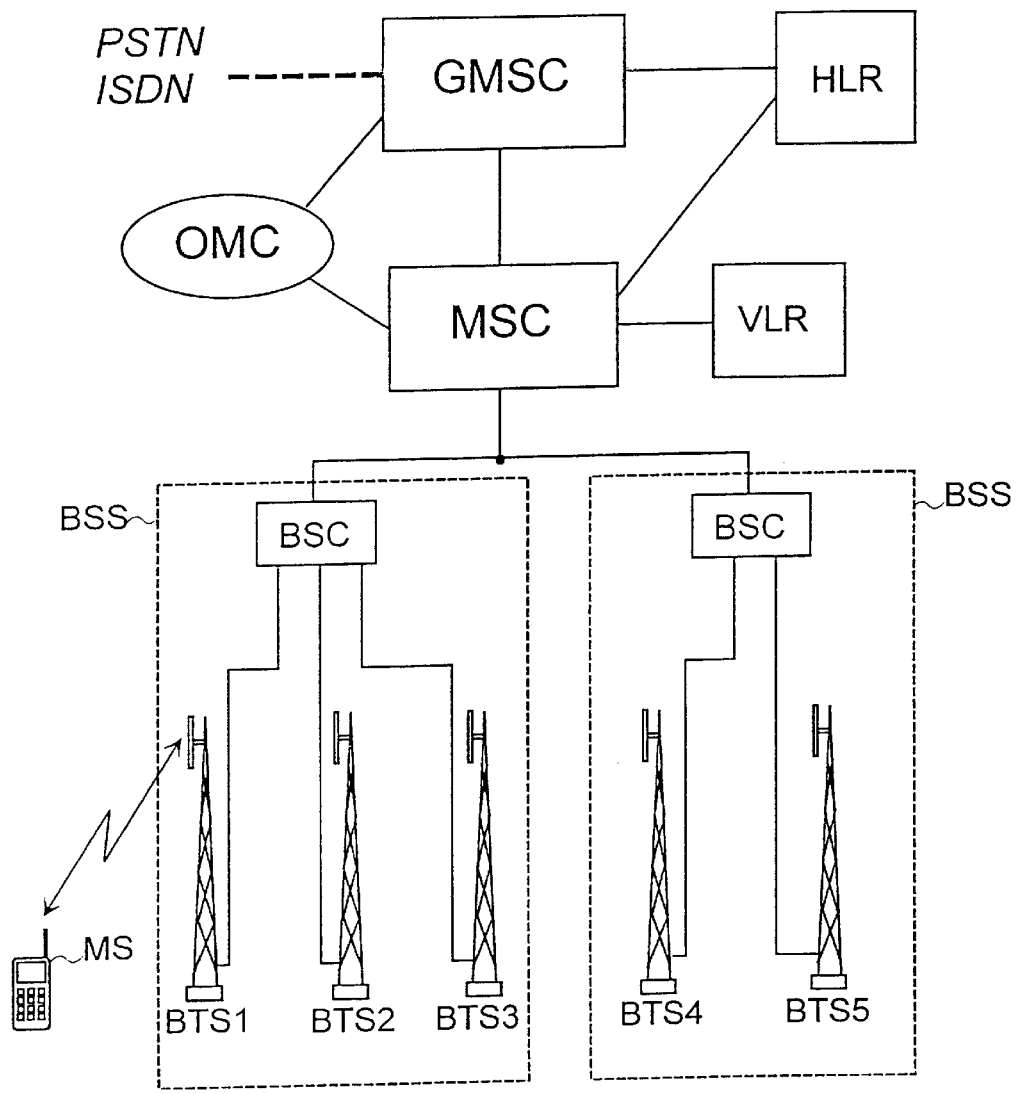
FIG. 1 is a block diagram of the structure of a mobile communication system.

The present invention can be applied in any cellular mobile communication system. In the following, the invention will be described in greater detail with reference, by way of example, to the pan-European digital mobile communication system GSM. FIG. 1 illustrates the above-described structure of a GSM network in a simplified manner. For a more accurate description of the GSM system, reference is made to the GSM recommendations and "The GSM System for Mobile Communications" by M. Mouly and M-B. Pautet, Palaiseau, France, 1992, ISBN: 2-9507190-0-7.

The present invention can be applied to different kinds of channel coding. An example of channel coding is the convolution coding which is used on a traffic channel of the GSM system and defined in GSM Recommendation 05.03. The efficiency of convolution coding can be indicated with the convolution code ratio X/Y, which means that X data bits are represented by Y code bits in channel coding. On a full-rate GSM traffic channel, the convolution code ratios are 1/2 (buffered), 1/3 and 1/6 for data rates of 9.6 kbit/s, 4.8 kbit/s and 0.3 to 2.4 kbit/s, respectively. A full-rate speech channel employs 1/2 channel coding. The most efficient channel coding is 1/6, the second most efficient is 1/3, and the weakest is 1/2.

As stated above, a problem with handovers of the prior art is that the quality of the radio connection after a handover is not always sufficient for a connection using weak channel coding. Another problem is that since network planning is usually made for channels using normal channel coding, a handover is not performed to a target cell whose signal level and/or quality is too low for a connection using normal channel coding, but sufficient for a connection employing more efficient channel coding.

In the following, the invention will be described more generally without reference to any specific type of channel coding.

Figure 2:
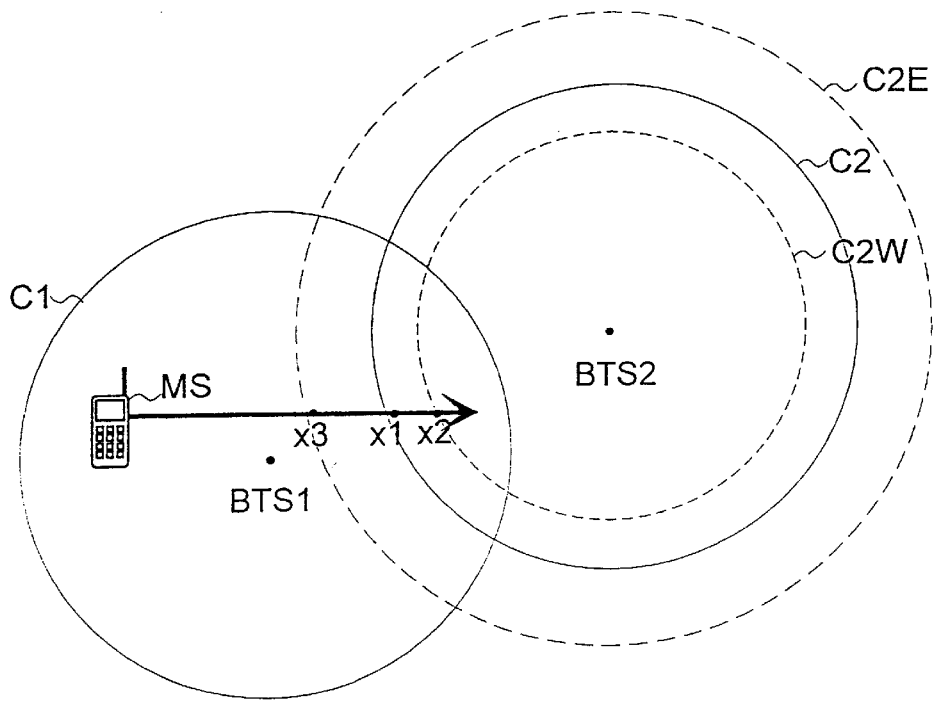
FIG. 2 shows an example of handover in a cellular network.

FIG. 2 shows an example of a handover when a mobile station MS moves within the area of base station BTS1 in a cellular network. The area of the base station in which the MS is located before the handover will be hereafter called a source cell, and the area of the base station to which the handover is performed will be called a target cell. FIG. 2 illustrates the coverage areas C1 and C2 of the base stations BTS1 and BTS2; within these coverage areas the quality of a radio connection using normal error correction, e.g. channel coding, usually remains sufficiently high to prevent calls from being lost. A radio connection using error correction weaker than normal requires a better signal than normal to achieve sufficient connection quality; correspondingly, error correction that is more efficient than normal renders it possible to achieve sufficient connection quality even with a signal that is weaker than normal. This effect of error correction (in this case the effect of channel coding) on the size of the coverage area of a base station is illustrated in FIG. 2 by broken lines. Line C2W represents the effective coverage area of BTS2 with channel coding that is weaker than normal, and line C2E indicates the effective coverage area of BTS2 with channel coding that is more efficient than normal. Channel coding that is weaker than normal will hereafter be called weak channel coding, whereas channel coding that is more efficient than normal will be called powerful channel coding. In the case of GSM, normal channel coding refers herein to channel coding of a full-rate channel.

When a serving base station wishes to hand an ongoing call of a mobile station MS over to another base station (for instance on account of overload at the serving base station, or if the MS is located too far from the serving base station), a handover is performed to the base station of the neighbouring cell whose signal meets the pre-set handover criteria. In FIG. 2, a handover of the prior art is shown to be performed at point x1 when the MS moves in the direction of the arrow in the area C1 of BTS1 and arrives at the coverage area C2 offered by the normal channel coding of BTS2. One criterion used for triggering a handover is the results of neighbouring base station measurement, reported by the MS to the network. The handover of the prior art is started when the measurement results and other parameters of the connection meet the pre-set handover criteria. A common handover criterion for the selection of a target cell is the signal level of a neighbouring base station, e.g. BTS2, as compared with that of the serving base station BTS1. When the signal level meets the pre-set handover criterion and the other handover criteria are also met, a handover is performed from the serving base station BTS1 to the neighbouring base station BTS2 in question (in the case of FIG. 2 at point x1, for example). In the case of a radio connection using weak channel coding, the effective coverage area of BTS2 thus corresponds to area C2W indicated by a broken line in FIG. 2, and therefore a handover performed at point x1 is performed too soon and the call will probably be lost.

Figure 3:
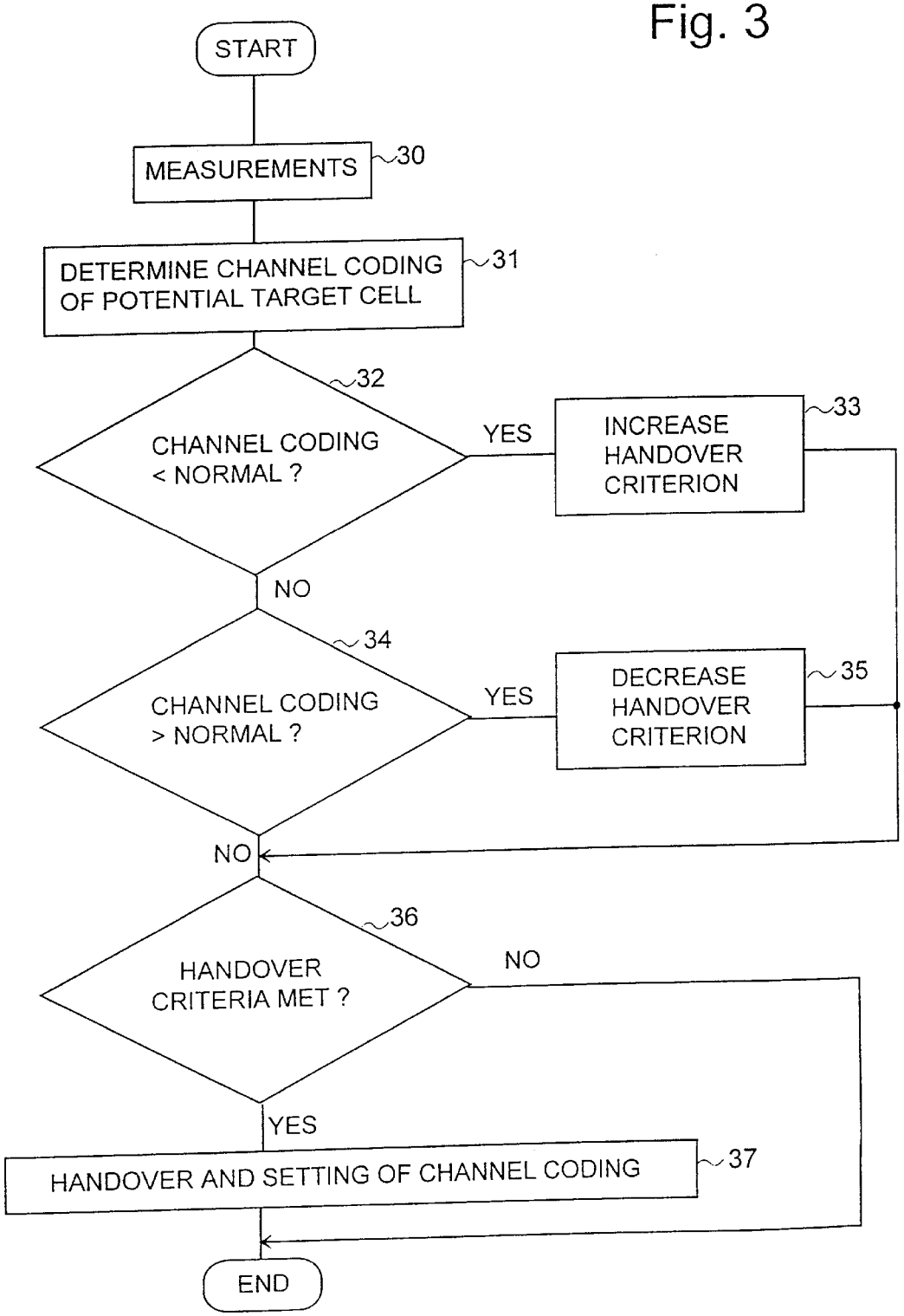
FIG. 3 is a flow chart of the preferred embodiment of the handover method of the invention.

In the following, the invention will be described in greater detail with reference to the preferred embodiment. In this embodiment, the error correction of a radio connection is implemented with channel coding. One handover criterion used in the preferred embodiment is the signal level of the target cell. FIG. 3 is a flow chart of the preferred embodiment of the handover method of the invention. For reasons of clarity, the handover procedure will be explained in the following with reference to only one channel coding alternative of one target cell. It will, however, be obvious to one skilled in the art that the following also applies if several potential target cells are monitored. In this case, the handover criterion of the invention is determined separately for the channel codings of each target cell; before a handover decision is made, each handover criterion is checked to find out whether it is possibly met.

In step 30 of FIG. 3, a mobile station MS measures signals from the neighbouring base stations according to the prior art. In step 31, the unit that makes the handover decision, preferably a base station controller BSC or a mobile services switching centre MSC, determines the channel coding offered to the radio connection by the possible target cell for handover (BTS2 in the case of FIG. 2), in accordance with the invention. The method of the invention is thus particularly well applicable even to networks where all base stations cannot use all the different channel coding alternatives. In step 32, the channel coding offered by BTS2 of the possible target cell is compared, according to the invention, with normal channel coding. If the channel coding of BTS2 of the possible target cell is weaker than normal, the value of the handover criterion is increased in step 33 from the normal; e.g. the handover criterion is set such that it is met when the signal level of the target cell is higher than −97 dBm. If the channel coding of BTS2 of the possible target cell is not weaker than normal, it is checked in step 34 whether the channel coding of BTS2 of the target cell is more powerful than normal channel coding. If the channel coding of BTS2 is more powerful than normal channel coding, the value of the handover criterion is decreased in step 35 from the normal; e.g. the handover criterion is set such that it is met when the signal level of the target cell is higher than −103 dBm.

A handover is performed (step 37) from the base station BTS1 of the source cell to the base station BTS2 of the target cell, if the pre-set handover criterion and any other handover criteria set by the operator are met (step 36). The handover criterion of the invention is met, for example, if it is set in step 33 to be −97 dBm, and the measurement results of the MS show that the signal level of BTS2 of the target cell meets this criterion. When the handover is performed, the channel coding of the radio connection is set to be as determined in step 31.

Certain discrete values can be stored for the handover criterion of the invention. In this case it is possible to define a predetermined handover criterion value for each protection level of error correction. In steps 33 and 35 of FIG. 3, a value corresponding to the channel coding that is being monitored is thus set for the handover criterion. If, for example the base station of the target cell uses weak, normal and powerful channel coding, the values of the handover criterion can be set to be −97, −100 and −103 dBm, respectively.

In the following, the invention will be described more closely with reference to the example of FIG. 2. As shown in FIG. 2, BTS2 can, in addition to normal channel coding, also offer powerful (cell coverage area C2E) and weak (cell coverage area C2W) channel coding to a connection. If a handover is planned to be performed to BTS2 such that powerful channel coding will be used, the handover criterion is decreased from the normal according to the invention; this triggers the handover, which is performed e.g. as early as at point x3, provided that the other handover criteria optionally set by the operator are met. In this example, the radio connection between BTS2 and the MS is continued after the handover with powerful channel coding. If a handover is planned to be performed to the BTS2 of the target cell such that weak channel coding will be used, the handover criterion is increased according to the preferred embodiment of the invention. In this case, the handover and the setting of channel coding are performed, for instance, at point x2 indicated in FIG. 2. The channel coding of the connection is then set at BTS2 as weak channel coding.

According to another embodiment of the invention, a handover is performed as stated above with reference to the preferred embodiment, except that, in addition to the channel codings offered to the radio connection by the base station of the target cell, the channel coding desired for the MS connection is also determined in step 31 of FIG. 3. In connection with call set-up, for example, an MS or some other network element may indicate the wishes it has concerning the error correction or transmission rate of the connection. If the base station of the target cell can offer the desired/allowed channel coding and also other channel codings, the aim is to select the desired/allowed channel coding that meets the handover criterion as the channel coding of the target cell. This channel coding will be used from step 32 of FIG. 3 onwards as the channel coding determining the handover criterion of the method of the invention and as the channel coding to be set for the connection. If more than one channel codings meet the handover criterion determined according to the invention, the channel coding that has the widest margin for the handover criterion in question will be selected as the channel coding of the target cell for the handover.

Instead of the signal level of the target cell, used as the handover criterion in the preferred embodiment, other embodiments of the invention may use some other suitable handover criterion of the prior art. In cellular systems where the quality of the signal from neighbouring base stations is measured, this quality can be used as the handover criterion. The signal from the neighbouring base stations is measured in a manner suitable for each system.

The claimed target cell selection and handover to a target cell are suitable for many different cases of handover. Load at the serving base station, transmission delay on the radio connection, low quality or level of the signal of the serving base station, for example, may give rise to a need for handover and start the selection of a target cell for a possible handover.

The protection level of the error correction used in the source cell is not relevant to the handover method of the invention. For example, the handover of a connection implemented with weak channel coding in the source cell to a target cell without changing the channel coding is performed, according to the invention, such that the connection will use weak channel coding in the target cell. The present handover method is suitable for changing the error correction simultaneously with a handover. The method of the invention is not significant in practice, if the error correction of the connection represents the normal protection level in the target cell. The functionality of the invention can be ignored in the handover, and the handover can be implemented according to the prior art.

In addition to the measurement and handover means required for a handover of the prior art, the mobile communication system implementing the functionality of the invention comprises means for determining error correction possible for the connection in a potential target cell for the handover, means for determining a handover criterion on the basis of the error correction determined, and means for setting the error correction as said error correction determined during the handover. The means for performing a handover of the invention are preferably provided at the base station controller BSC or the mobile services switching centre MSC.

The drawings and the description relating to them are intended merely to illustrate the inventive concept. In its details, the handover of the invention may vary within the scope of the claims. Although the invention has been described above mainly with reference to channel coding, the invention can also be used with other kinds of error correction. According to the invention, the use of error correction in the selection of the target cell for handover can be combined with any handover criteria of the prior art. In addition to mobile communication systems of the TDMA type, the invention is also applicable to other cellular mobile communication systems, e.g. systems implemented by the CDMA technology, particularly in the case of hard handover.

What is claimed is:

1. A handover method for handing over a mobile station radio signal call connection from a serving base station to a neighboring base station of a mobile communication system, the system having a capability of providing error correction of the radio signal with different protection levels, the base stations each emitting a signal, said method comprising:

measuring a characteristic of the signal emitted by each base station at a receiver of the mobile station;

determining at least one possible error correction for a call connection to the neighboring base station;

determining at least one first handover criterion on the basis of the determined possible error correction;

comparing the signal measurements obtained in said measuring step with handover criteria including the determined first handover criterion;

performing a handover from the serving base station to the neighboring base station when the comparing step indicates that the signal measurement for the neighboring station meets the handover criteria; and setting the error correction for the call connection as the error correction of the neighboring base station.

2. The method of claim 1 wherein the signal characteristic of the signal emitted by the neighboring base station is variable about a normal value, and the possible error correction is variable about a normal value, and said step of determining at least one first handover criterion comprises:

when the possible error correction for a call connection to the neighboring base station is weaker than normal, setting the first handover criterion to require the signal characteristic of the signal emitted by the neighboring base station to be higher than normal; and when the possible error correction for a call connection in the neighboring cell is more efficient than normal, setting the first handover criterion to require the signal characteristic of the signal emitted by the neighboring base station to be lower than normal.

3. The method of claim 2 wherein said step of determining at least one first handover criterion further comprises:

determining a normal handover criterion based on the normal signal characteristic value; and using the normal handover criterion as the first handover criterion when the possible error correction has its normal value, and wherein said step of setting when the possible error correction for a call connection to the neighboring base station is weaker than normal is carried out to increase the first handover criterion from the normal handover criterion; and said step of setting when the possible error correction for a call connection to the neighboring base station is more efficient than normal is carried out to decrease the first handover criterion from the normal handover criterion.

4. A mobile communication system including a mobile station, a serving base station and a neighboring base station, the system being operative for handing over a mobile station radio signal call connection from the serving base station to the neighboring base station, and the system having a capability of providing error correction of the radio signal with different protection levels, the base stations each emitting a signal, said system comprising:

means for measuring a characteristic of the signal emitted by each base station at a receiver of the mobile station;

means for determining at least one possible error correction for a call connection to the neighboring base station;

means for determining at least one first handover criterion on the basis of the determined possible error correction;

means for comparing the signal measurements obtained in by the means for measuring step with handover criteria including the determined first handover criterion;

means for performing a handover from the serving base station to the neighboring base station when the result produced by the means for comparing indicates that the signal measurement for the neighboring station meets the handover criteria; and means for setting the error correction for the call connection as the error correction of the neighboring base station.

5. The mobile communication system of claim 4 wherein the error correction is channel coding.

* * * * *